(12) United States Patent
Castelli et al.

(10) Patent No.: US 9,898,654 B2
(45) Date of Patent: Feb. 20, 2018

(54) TRANSLATING PROCEDURAL DOCUMENTATION INTO CONTEXTUAL VISUAL AND AUDITORY GUIDANCE

(71) Applicant: INTERNATIONAL BUSINESS MACHINES CORPORATION, Armonk, NY (US)

(72) Inventors: Vittorio Castelli, Croton on Hudson, NY (US); Georgiana Dinu, White Plains, NY (US); Radu Florian, Danbury, CT (US); Gourab Kundu, White Plains, NY (US); Taesun Moon, Scarsdale, NY (US); Avirup Sil, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,035

(22) Filed: Mar. 29, 2016

(65) Prior Publication Data
US 2017/0286766 A1 Oct. 5, 2017

(51) Int. Cl.
*G06K 9/00* (2006.01)
*G06F 17/30* (2006.01)
*G06K 9/20* (2006.01)

(52) U.S. Cl.
CPC .... *G06K 9/00476* (2013.01); *G06F 17/30011* (2013.01); *G06F 17/30569* (2013.01); *G06F 17/30657* (2013.01); *G06K 9/00463* (2013.01); *G06K 9/2054* (2013.01)

(58) Field of Classification Search
CPC ...... G06K 9/476; G06K 17/30; G06K 9/0463; G06K 9/2054

USPC ......................................................... 382/181
See application file for complete search history.

(56) References Cited

U.S. PATENT DOCUMENTS

| 4,387,296 | A | * | 6/1983 | Newell | G06Q 30/04 235/376 |
|---|---|---|---|---|---|
| 6,046,712 | A | | 4/2000 | Beller et al. | |
| 6,457,024 | B1 | | 9/2002 | Felsentein et al. | |
| 6,738,040 | B2 | | 5/2004 | Jahn et al. | |
| 6,826,500 | B2 | | 11/2004 | Linthicum et al. | |
| 6,876,999 | B2 | | 4/2005 | Hill et al. | |
| 7,814,122 | B2 | | 10/2010 | Friedrich et al. | |

(Continued)

OTHER PUBLICATIONS

Billinghurst, et al., "Wearable Devices: New Ways to Manage Information" IEEE Computer, Jan. 1999, pp. 57-64.
Asai, et al., "Augmented Instructions-a Fusion of Augmented Reality and Printed Learning Materials" Fifth IEEE International Conference on Advanced Learning Technologies (ICALT), Jul. 2005, pp. 1-3.

(Continued)

*Primary Examiner* — Jerome Grant, II
(74) *Attorney, Agent, or Firm* — Tutunjian & Bitetto, P.C.; Yeen C. Tham

(57) ABSTRACT

A method and system are provided for assisting a user performing a procedure. The method includes capturing, by a camera, images of user activity while the user is performing the procedure. The method further includes converting, by computer processing system, the images of user activity into a text representation of user activity. The method also includes comparing, by the computer processing system, the textual representation of user activity to procedure documentation. The method additionally includes at least one of visually and audibly indicating, by a display and a speaker, a corrective action to the user responsive to a mismatch result from said comparing step.

18 Claims, 15 Drawing Sheets

(56) References Cited

U.S. PATENT DOCUMENTS

| | | | |
|---|---|---|---|
| 7,962,847 B2 | 6/2011 | Malkin et al. | |
| 8,473,914 B2 | 6/2013 | Bergman et al. | |
| 8,595,636 B2 | 11/2013 | Bergman et al. | |
| 8,640,034 B2 | 1/2014 | Bergman et al. | |
| 2007/0005539 A1 | 1/2007 | Bergman et al. | |
| 2009/0042654 A1* | 2/2009 | Barber | A63F 13/10 463/42 |
| 2009/0244323 A1* | 10/2009 | Carter | H04N 5/232 348/231.99 |
| 2011/0113766 A1* | 5/2011 | Kamiya | B60R 1/00 60/311 |
| 2015/0040166 A1* | 2/2015 | Tamura | H04N 5/76 725/80 |
| 2015/0100231 A1* | 4/2015 | Weir | G01C 21/34 701/400 |
| 2016/0187992 A1* | 6/2016 | Yamamoto | G06F 3/017 345/156 |
| 2016/0267319 A1* | 9/2016 | Murillo | G06K 9/00255 |
| 2016/0364009 A1* | 12/2016 | Lemberger | H04N 21/4424 |
| 2017/0092142 A1* | 3/2017 | Dow | G09B 5/02 |

OTHER PUBLICATIONS

Nilsson, et al., "Fun and Usable: Augmented Reality Instructions in a Hospital Setting" Proceedings of the 19th Australasian Conference on Computer-Human Interaction: Entertaining User Interfaces, ACM, Nov. 2007, pp. 1-8.

Zenati, et al., "Assistance to Maintenance in Industrial Process Using an Augmented Reality System", 2004 IEEE International Conference on Industrial Technology, Dec. 2004, pp. 848-852, vol. 2.

Gegusch, et al., "Multimodal User Support in IPS$^2$ Business Model" Proceedings of the 1st CIRP Industrial Product-Service Systems (IPS2) Conference, Apr. 2009, pp. 125-131.

Weston, et al., "Samy Bengio, and Nicolas Usunier,"Large Scale Image Annotation: Learning to Rank with Joint Word-Image Embeddings European Conference on Machine Learning, Sep. 2010, pp. 1-16.

Vinyals, et al., "Show and Tell: A Neural Image Caption Generator" Computer Vision and Pattern Recognition, Apr. 2005, pp. 1-9.

\* cited by examiner

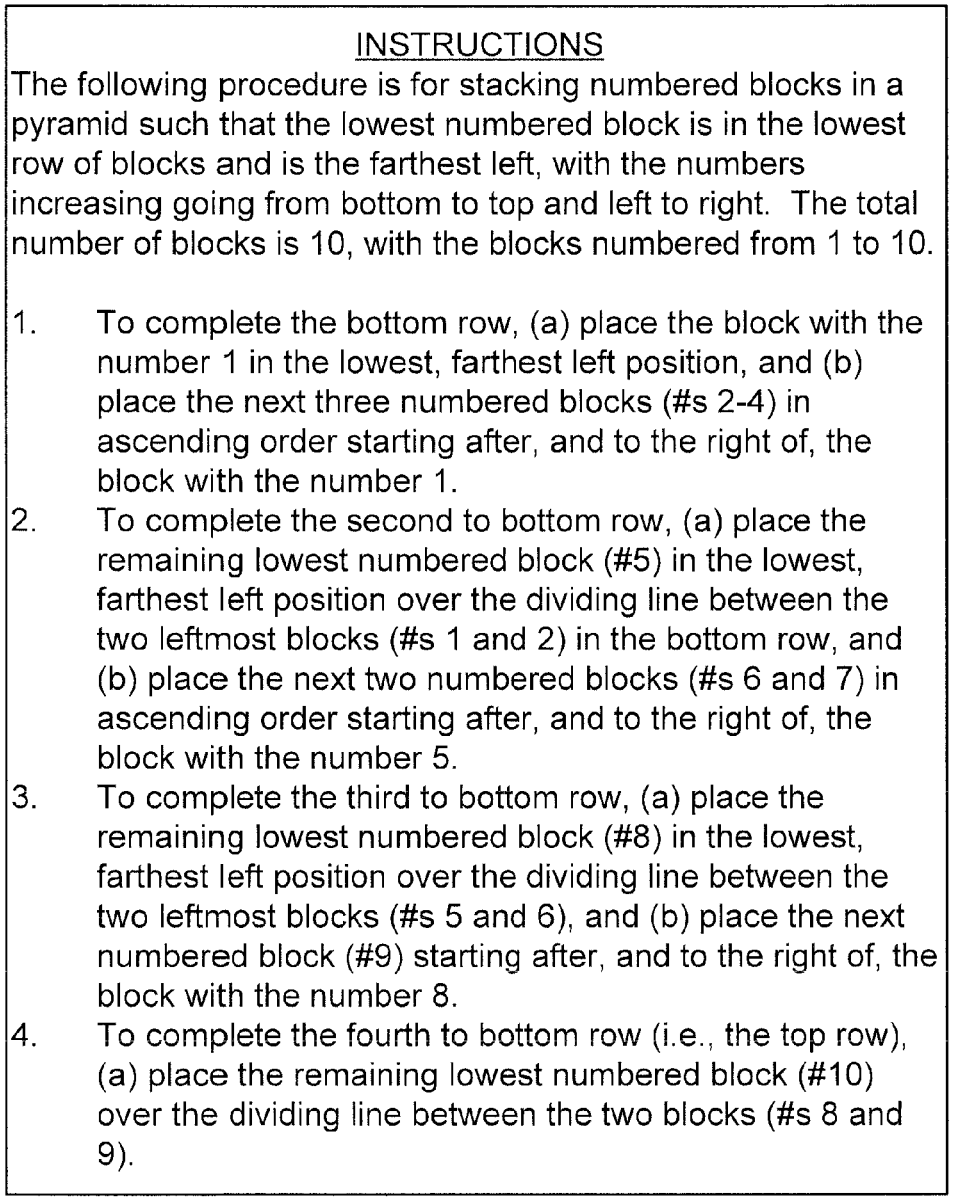

INSTRUCTIONS

The following procedure is for stacking numbered blocks in a pyramid such that the lowest numbered block is in the lowest row of blocks and is the farthest left, with the numbers increasing going from bottom to top and left to right. The total number of blocks is 10, with the blocks numbered from 1 to 10.

1. To complete the bottom row, (a) place the block with the number 1 in the lowest, farthest left position, and (b) place the next three numbered blocks (#s 2-4) in ascending order starting after, and to the right of, the block with the number 1.
2. To complete the second to bottom row, (a) place the remaining lowest numbered block (#5) in the lowest, farthest left position over the dividing line between the two leftmost blocks (#s 1 and 2) in the bottom row, and (b) place the next two numbered blocks (#s 6 and 7) in ascending order starting after, and to the right of, the block with the number 5.
3. To complete the third to bottom row, (a) place the remaining lowest numbered block (#8) in the lowest, farthest left position over the dividing line between the two leftmost blocks (#s 5 and 6), and (b) place the next numbered block (#9) starting after, and to the right of, the block with the number 8.
4. To complete the fourth to bottom row (i.e., the top row), (a) place the remaining lowest numbered block (#10) over the dividing line between the two blocks (#s 8 and 9).

FIG. 7

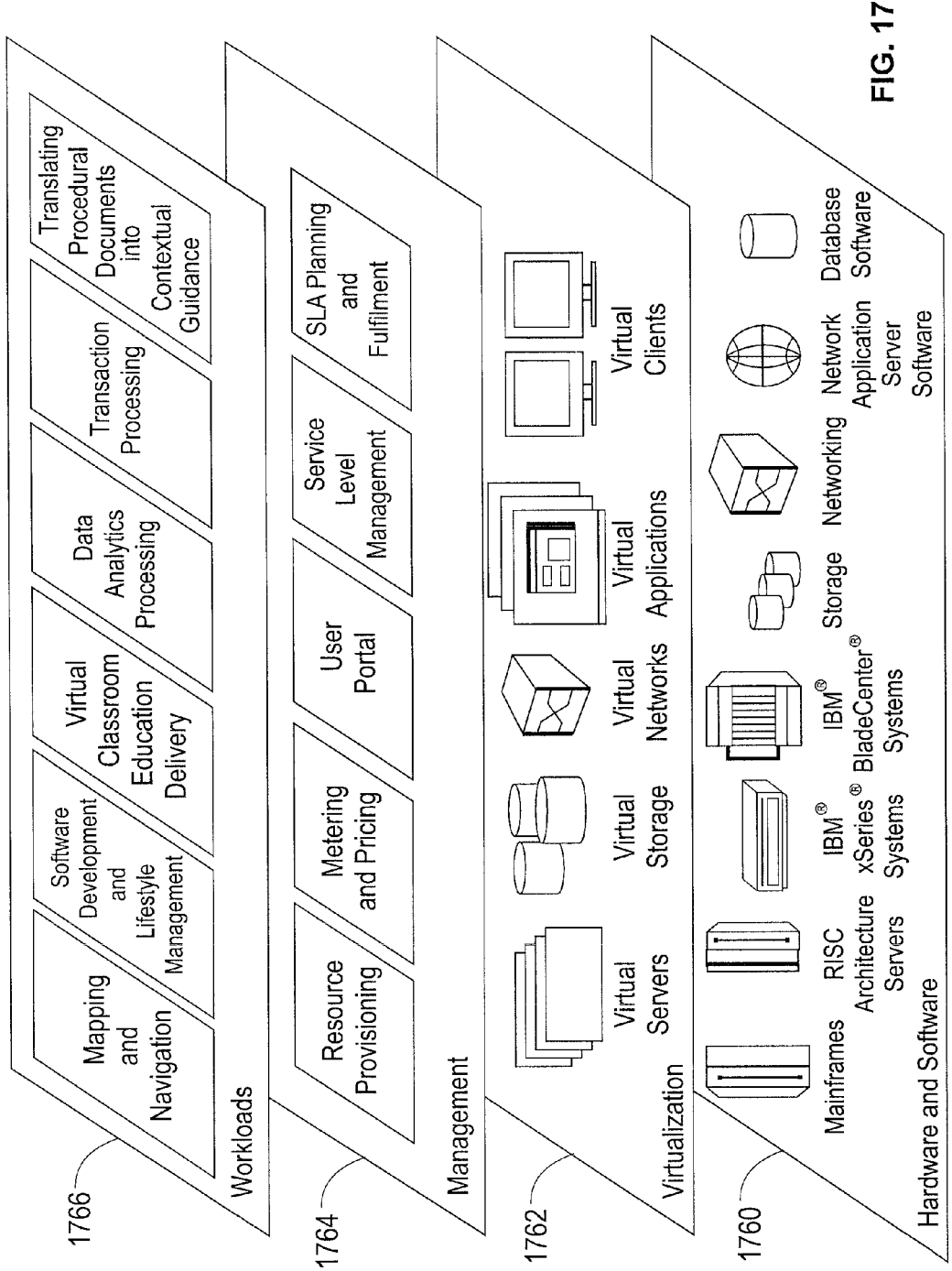

TRANSLATING PROCEDURAL DOCUMENTATION INTO CONTEXTUAL VISUAL AND AUDITORY GUIDANCE

BACKGROUND

Technical Field

The present invention generally relates to cognitive and contextual computing, and more particularly to translating procedural documentation into contextual visual and auditory guidance.

Description of the Related Art

Many manual procedures are executed by people who are not familiar with them. Examples of manual procedures include, but are not limited to, a first time setup, the troubleshooting of specific problem, and so forth. Many such procedures are non-trivial, require both hands, and are complex to follow when on documentation, and must be stopped and restarted frequently (with dirty hands, and so forth) when on instructional videos. Thus, there is a need for a system to guide the user through a procedure without interruption, using available documentation as guide.

SUMMARY

According to an aspect of the present principles, a method is provided for assisting a user performing a procedure. The method includes capturing, by a camera, images of user activity while the user is performing the procedure. The method further includes converting, by computer processing system, the images of user activity into a text representation of user activity. The method also includes comparing, by the computer processing system, the textual representation of user activity to procedure documentation. The method additionally includes at least one of visually and audibly indicating, by a display and a speaker, a corrective action to the user responsive to a mismatch result from said comparing step.

According to another aspect of the present principles, a non-transitory computer readable storage medium is provided. The non-transitory computer readable storage medium includes a computer readable program for assisting a user performing a procedure. The computer readable program when executed on a computer causes the computer to perform steps of a method. The method includes capturing, by a camera, images of user activity while the user is performing the procedure. The method further includes converting, by computer processing system, the images of user activity into a text representation of user activity. The method also includes comparing, by the computer processing system, the textual representation of user activity to procedure documentation. The method additionally includes visually or audibly indicating, by a display or a speaker, a corrective action to the user responsive to a mismatch result from said comparing step.

According to yet another aspect of the present principles, a system is provided for assisting a user performing a procedure. The system includes a camera for capturing images of user activity while the user is performing the procedure. The system further includes a computer processing system for converting the images of user activity into a text representation of user activity, and comparing the textual representation of user activity to procedure documentation. The system also includes a display or speaker for at least one of visually and audibly indicating a corrective action to the user responsive to a mismatch result from said comparing step.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 7 shows an exemplary a textual part of a procedure to which the present principles can be applied, in accordance with an embodiment of the present principles;

FIG. 17 shows exemplary abstraction model layers, in accordance with an embodiment of the present principles.

DETAILED DESCRIPTION

The present principles are directed to translating procedural documentation into contextual visual and auditory guidance.

In an embodiment, the present principles provide a method for guiding a user through a manual procedure for which instructions exist, by showing relevant steps, displaying suggestions and highlighting components via an optical head mounted display. One advantage of the present principles is that it is not limited to computer-based procedures, and does not require specially constructed documentation. Another advantage of the present principles is that they do not rely on an existing model. These and many other attendant advantages of the present principles are readily determined by one of ordinary skill in the art given the teachings of the present principles provided herein, while maintaining the spirit of the present principles.

Thus, in an embodiment, only the documentation that comes with the item is needed (no social/connected/cloud knowledge is needed). Of course, in another embodiment, the present principles can be use of such knowledge to further supplement the assistance provided to the user.

Figure 1:
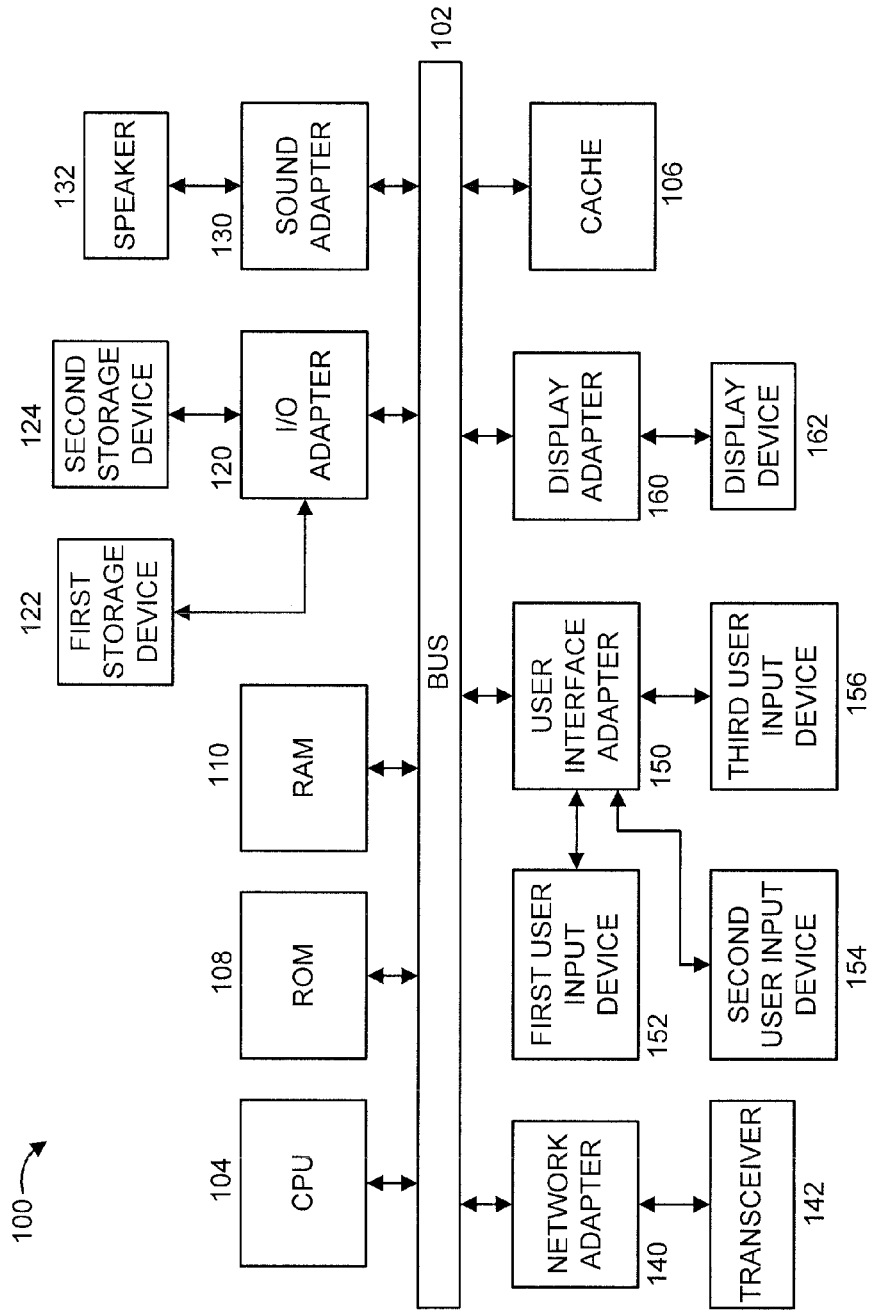
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
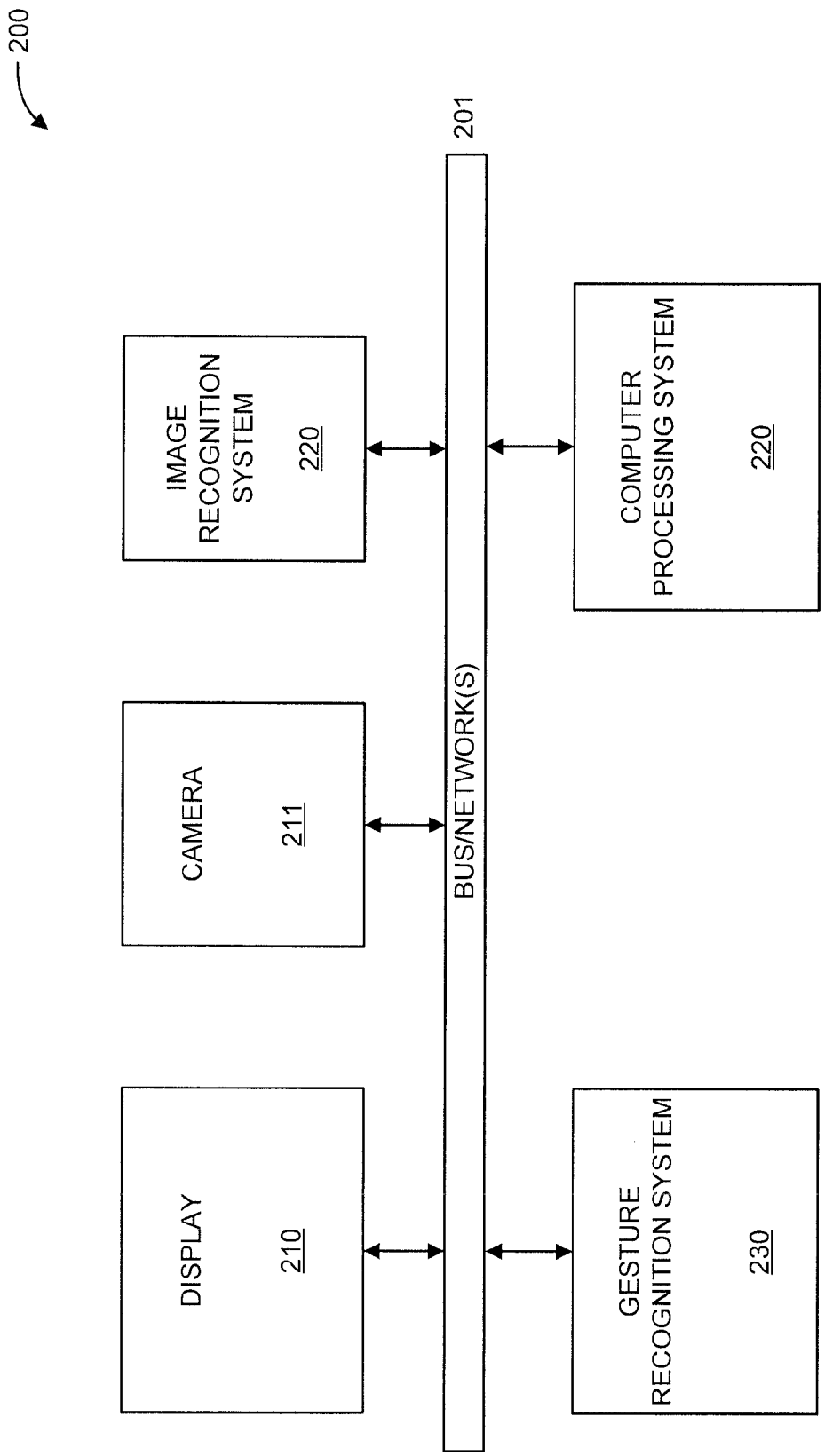
FIG. 2 shows a system for translating procedural documentation into contextual visual and auditory guidance, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
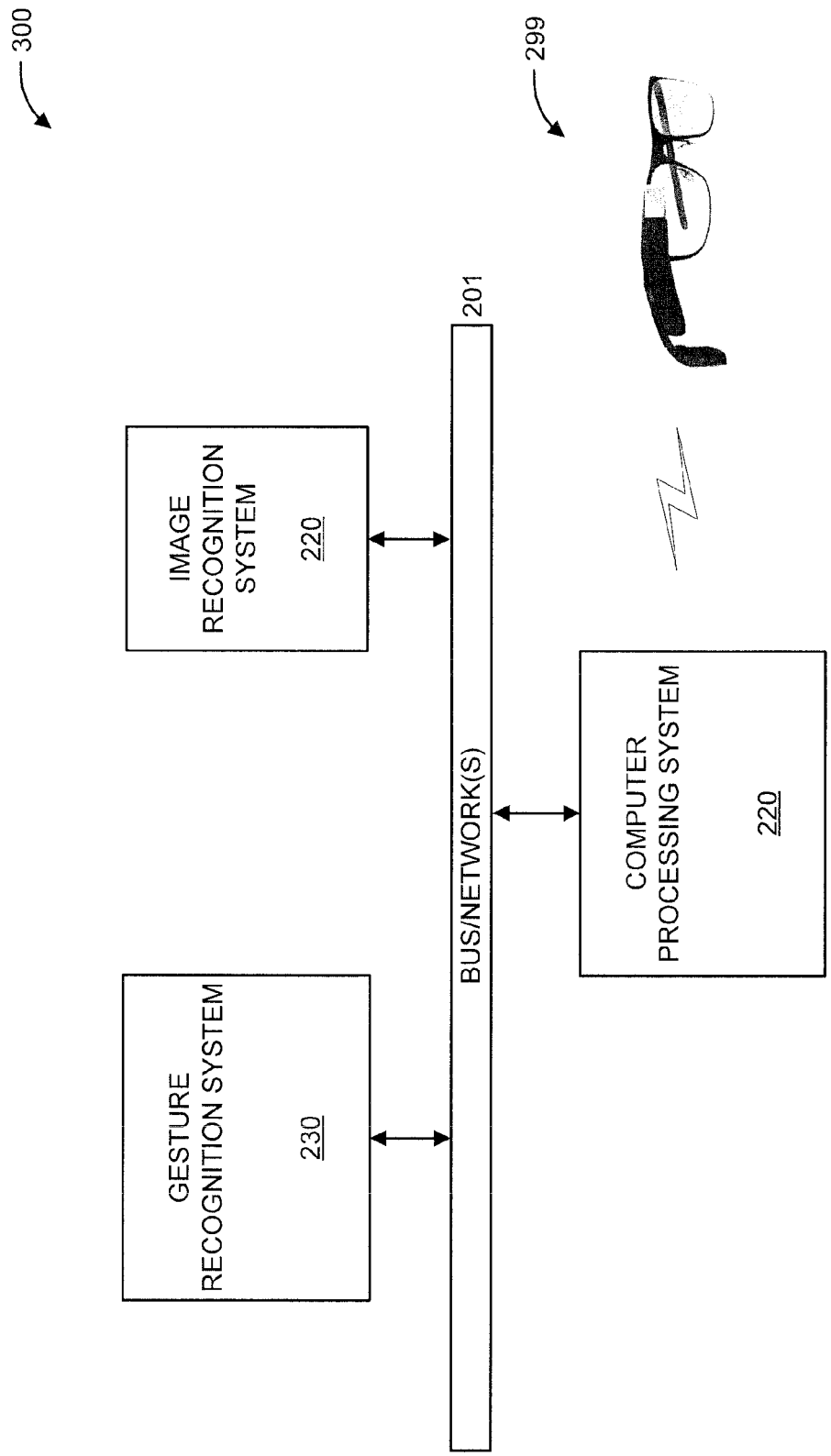
FIG. 3 shows a variant of the system of FIG. 2, in accordance with an embodiment of the present principles.

Also, it is to be appreciated that variant (system) 300 described below with respect to FIG. 3 is a system for implementing respective embodiments of the present principles. Part or all of processing system 100 may be implemented in one or more of the elements of system 300.

Figure 5:
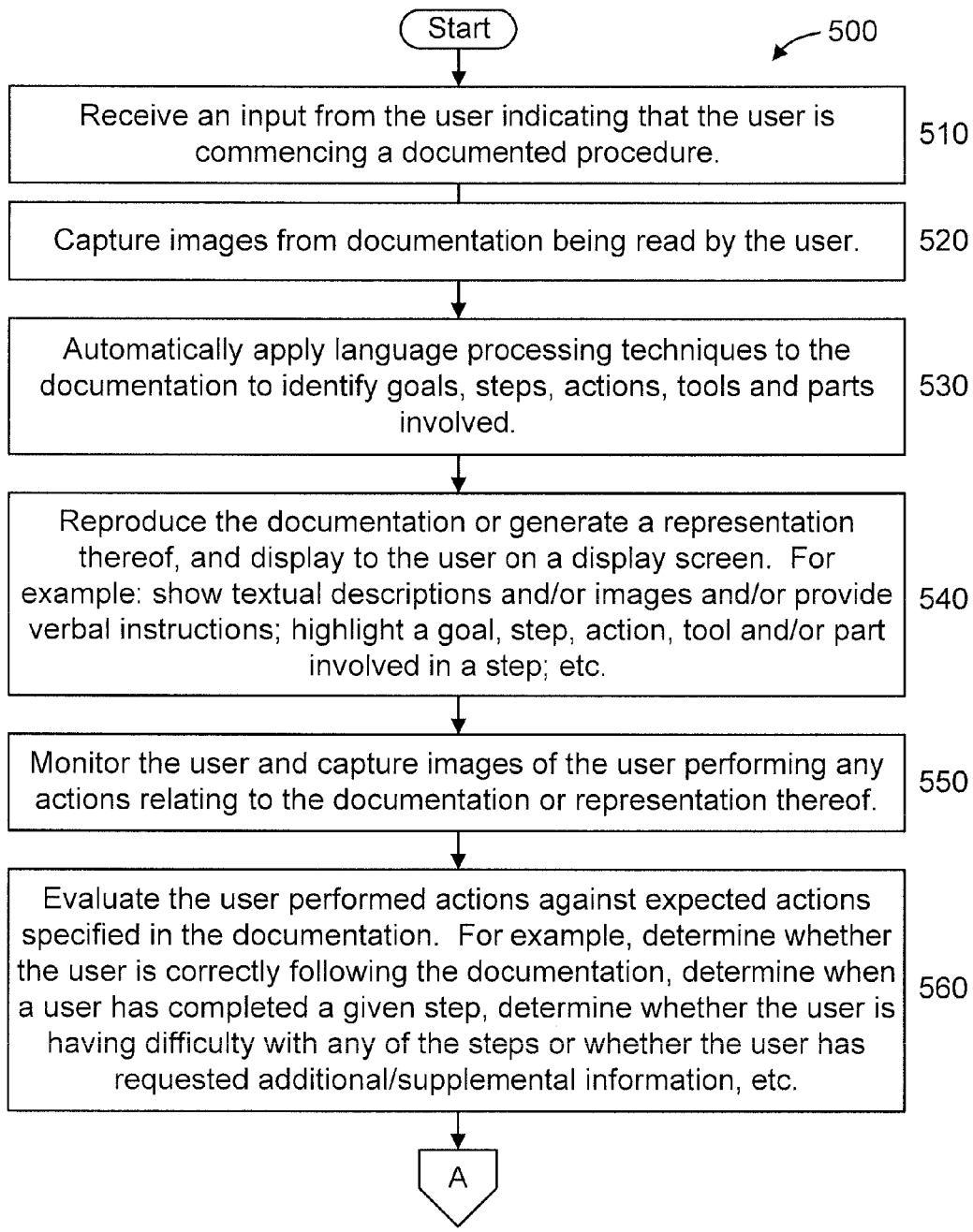
FIGS. 5-6 show an exemplary method for translating procedural documentation into contextual and auditory guidance, in accordance with an embodiment of the present principles.
Figure 6:
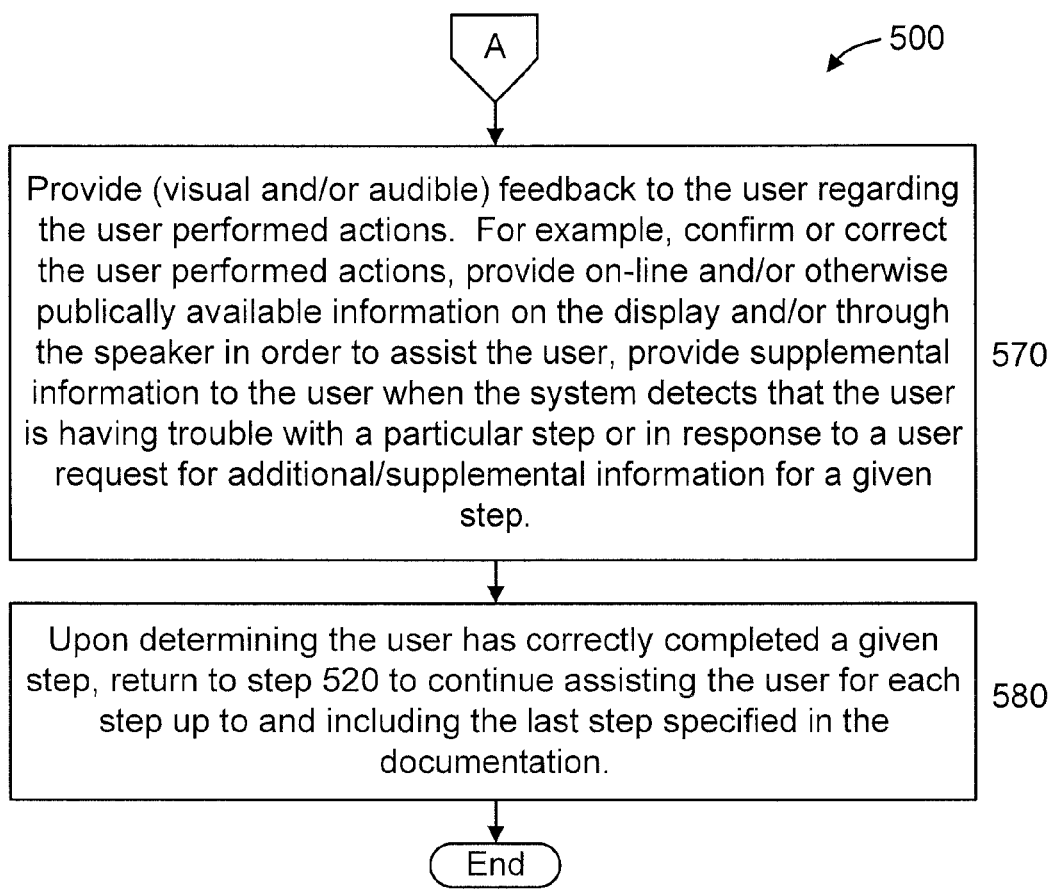

Further, it is to be appreciated that processing system 100 may perform at least part of the methods described herein including, for example, at least part of method 500 of FIGS. 5-6. Similarly, part or all of system 200 may be used to perform at least part of method 500 of FIGS. 5-6 Additionally, part or all of system 300 may be used to perform at least part of method 500 of FIGS. 5-6.

FIG. 2 shows a system 200 for translating procedural documentation into contextual visual and auditory guidance, in accordance with an embodiment of the present principles. The system 200 includes a display 210, a camera 211, an image recognition system 220, a gesture recognition system 230, and a computer processing system 240.

The display 210 can provide contextual visual guidance to the user. For example, the display 210 can allow the user to view information for assisting the user to perform a procedural document.

The camera 211 can capture images/video of objects seen by the user. The images/video can then be processed by the computer processing system 240 and/or any of the systems under its control. The camera 211 can be capable of capturing still and moving images.

The computer processing system 240 essentially controls the other systems of system 200, including the image recognition system 220 and the gesture recognition system 230.

The image recognition system 220 recognizes images. The image recognition system 220 can, for example, map available images from documentation to what the user sees.

The gesture recognition system 230 recognizes gestures. The gesture recognition system 230 can, for example, recognize actions taken by a user (grabbing a wrench, turning clockwise instead of counter-clockwise, and so forth).

The computer processing system 240 performs functions relating, for example, but not limited to: (i) image-to-words neural embeddings, to map images (e.g., in the documentation) to words (e.g., in the documentation and/or generated in a textual representation by system 200); (ii) word embeddings, to map words from the documentation to images (e.g., in the documentation and/or captured by camera 211); (iii) similarity-based alignment and generalization; and (iv) aligning demonstrated user actions with existing documentation. The word embeddings can involve the use of word sense disambiguation, part of speech detection, synonym evaluation, and so forth. Moreover, the computer processing system 240 can generate hypotheses of the current place in a procedure, and provide feedback towards the next step.

Further, the system 200 can perform continuous matching between the text and images of documentation, and what is seen through the camera, in order to provide visual and auditory guidance to a user.

A speaker 241 of the computer processing system can provide auditory guidance to the user.

In an embodiment, one or more of the elements of system 200 is implemented in the cloud using a cloud-based configuration.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

FIG. 3 shows a variant 300 of system 200 of FIG. 2, in accordance with an embodiment of the present principles.

The elements of variant 300 are similar to system 200, except for the display 210 and camera 211. Further regarding the display 210 and camera of FIG. 2, in an embodiment such as that shown in FIG. 3, the display 210 can be a heads-up display having the camera 211 attached thereto. For example, a hat or head-mounted apparatus 299 can be used to support the display 210 and camera 211 on the user in a manner that does not interfere with the actions of the user as well as capture images of the documentation and the user's actions without any interference imparted to the user. In such a case, the head-mounted apparatus 299 can communicate with system 200 wirelessly (e.g., through WIFI, Bluetooth, etc.) and/or using a wired connection (e.g., a USB double-ended connector). In an embodiment, the display 210 and camera 211 are implemented using Google Glass® eyewear. The Google Glass eyewear or similarly configured device can communicate wirelessly with the computer processing system (via, e.g., a network adapter).

Figure 4:
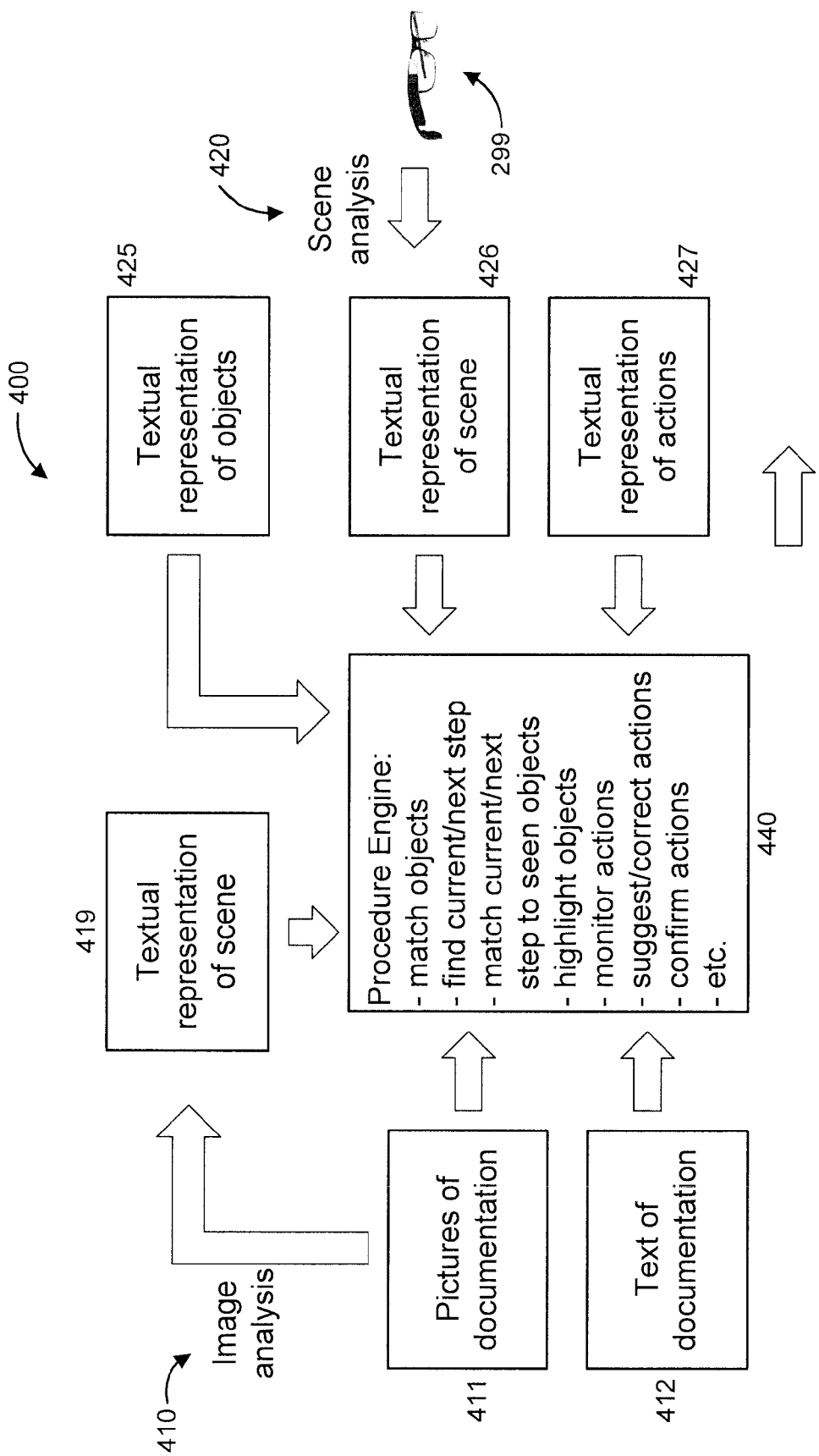
FIG. 4 shows an exemplary overview of processing performed by the system of FIG. 2 and/or the system of FIG. 3, in accordance with an embodiment of the present principles.

FIG. 4 shows an exemplary overview of processing performed by the system 200 of FIG. 2 and/or the system 300 of FIG. 3, in accordance with an embodiment of the present principles.

Image analysis 410 is applied to pictures 411 of the documentation and text 412 of the documentation in order to generate a textual representation 419 of a scene.

Scene analysis 420 is applied to pictures of the scene to generate a textual representation of objects 425, a textual representation of the scene 426, and a textual representation of user actions 427.

Word embedding 430 is performed to map words from the documentation to pictures in the documentation and pictures 421 of the scene.

A procedure processing engine 440, formed in the computer processing system 240, performs the following: match objects; find the current/next step; match the current/next step to seen objects; highlight objects; monitor actions; suggest/correct actions; confirm actions; and so forth.

FIGS. 5-6 show an exemplary method 500 for translating procedural documentation into contextual and auditory guidance, in accordance with an embodiment of the present principles.

At step 510, receive an input from the user indicating that the user is commencing a documented procedure.

At step 520, capture images from documentation being read by the user.

At step 530, automatically apply language processing techniques to the documentation to identify goals, steps, actions, tools and parts involved.

At step 540, reproduce the documentation or generate a representation thereof, and display to the user on a display screen. In an embodiment, step 540 can include showing textual descriptions and/or images and/or providing verbal instructions. In an embodiment, step 540 can include highlighting a goal, step, action, tool and/or part involved in a step (e.g., the current step and/or the next step).

At step 550, monitor the user and capture images of the user performing any actions relating to the documentation or representation thereof.

At step 560, evaluate the user performed actions against expected actions specified in the documentation. In an embodiment, step 560 involves determining whether the user is correctly following the documentation. Moreover, in an embodiment, step 560 involves determining when a user has completed a given step. Further, in an embodiment, step 560 involves determining whether the user is having difficulty with any of the steps or whether the user has requested additional/supplemental information.

At step 570, provide (visual and/or audible) feedback to the user regarding the user performed actions. For example, either confirm or correct the user performed actions. Any visual and/or auditory feedback (e.g., an indication) can be provided (e.g., display a green light, have the system state "continue", and/or so forth). If the user is doing something incorrect, then the corrective action (e.g., audibly state "do not turn the screw counter-clockwise, instead turn it clockwise", "Careful—rotate the screw clockwise—the other way" and/or so forth) can be specified.

In an embodiment, step 570 can include providing on-line and/or otherwise publically available information on the display and/or through the speaker in order to assist the user. For example, in an embodiment, textual or image based content from the Internet can be converted into audible instructions to supplement any visual instructions provided by the documentation or can be used in its found form (textual or image based, which can be displayed to the user). Such an application is particularly useful when the original documentation includes parts/steps that only have images showing user actions without any corresponding textual information for such parts/steps as well as for steps that are not described clearly or sufficiently. For example, the supplemental information can be provided to the user when the system detects that the user is having trouble with a particular step or in response to a user request for additional/supplemental information for a given step.

At step 580, upon determining the user has correctly completed a given step, return to step 520 to continue assisting the user for each step up to and including the last step specified in the documentation.

Figure 14:
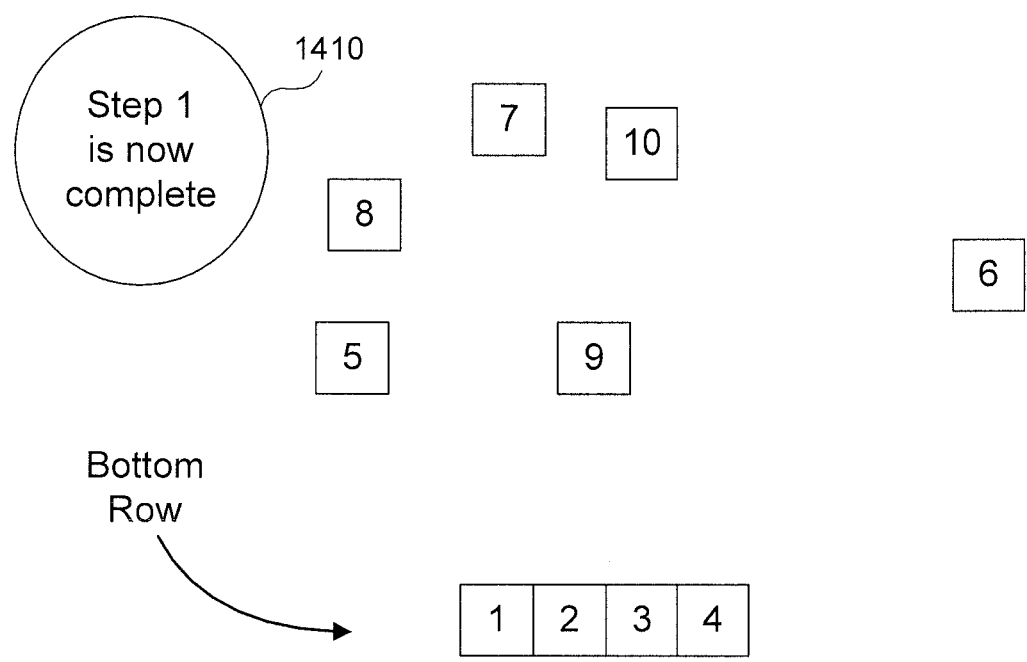
FIG. 14 shows a progress update on the user's performance of the procedure of FIG. 7, in accordance with an embodiment of the present principles.

Further regarding step 570, upon a user having difficulty with a step, in an embodiment, the following can be performed: searching the internet for the procedure; identifying relevant pages; matching the current step in the procedure with the steps described in the relevant pages; identifying pages that clarify the problematic step; (conceptually)

replacing the problematic step in the original documentation with the clarifying information; and executing the procedure with the assistance of a tool (see FIG. 14).

FIG. 7 shows an exemplary a textual part 710 of a procedure 700 to which the present principles can be applied, in accordance with an embodiment of the present principles. The procedure 600 is for stacking numbered blocks in a pyramid such that the lowest numbered block is the farthest left block in the lowest row of blocks, with the numbers increasing going from bottom to top and left to right. The total number of blocks is 10, with the blocks numbered from 1 to 10. As shown, the procedure 700 includes four steps expressed using text as well as an image of the blocks in an unstacked configuration (FIG. 8) as well as an image of the completed pyramid (FIG. 9).

Figure 8:
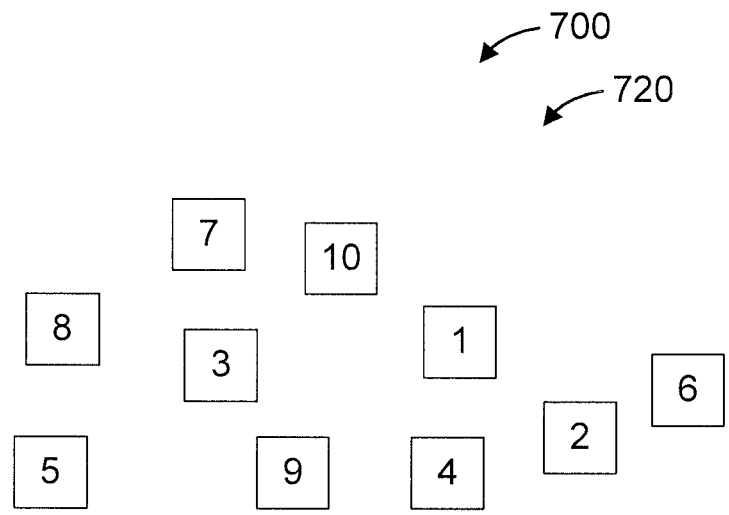
FIG. 8 shows an exemplary image of the procedure of FIG. 7, in accordance with an embodiment of the present principles.
Figure 9:
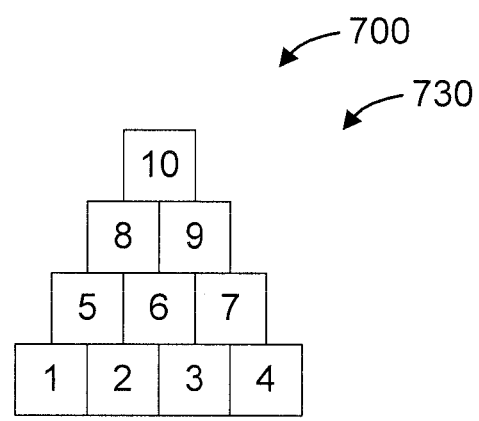
FIG. 9 shows another exemplary image of the procedure of FIG. 7, in accordance with an embodiment of the present principle.

FIG. 8 shows an exemplary image 720 of the procedure 700 of FIG. 7, in accordance with an embodiment of the present principles. In particular, FIG. 8 shows the blocks in an unstacked configuration. FIG. 9 shows another exemplary image 730 of the procedure 700 of FIG. 7, in accordance with an embodiment of the present principles. In particular, FIG. 9 shows the blocks stacked into a completed pyramid.

Figure 10:
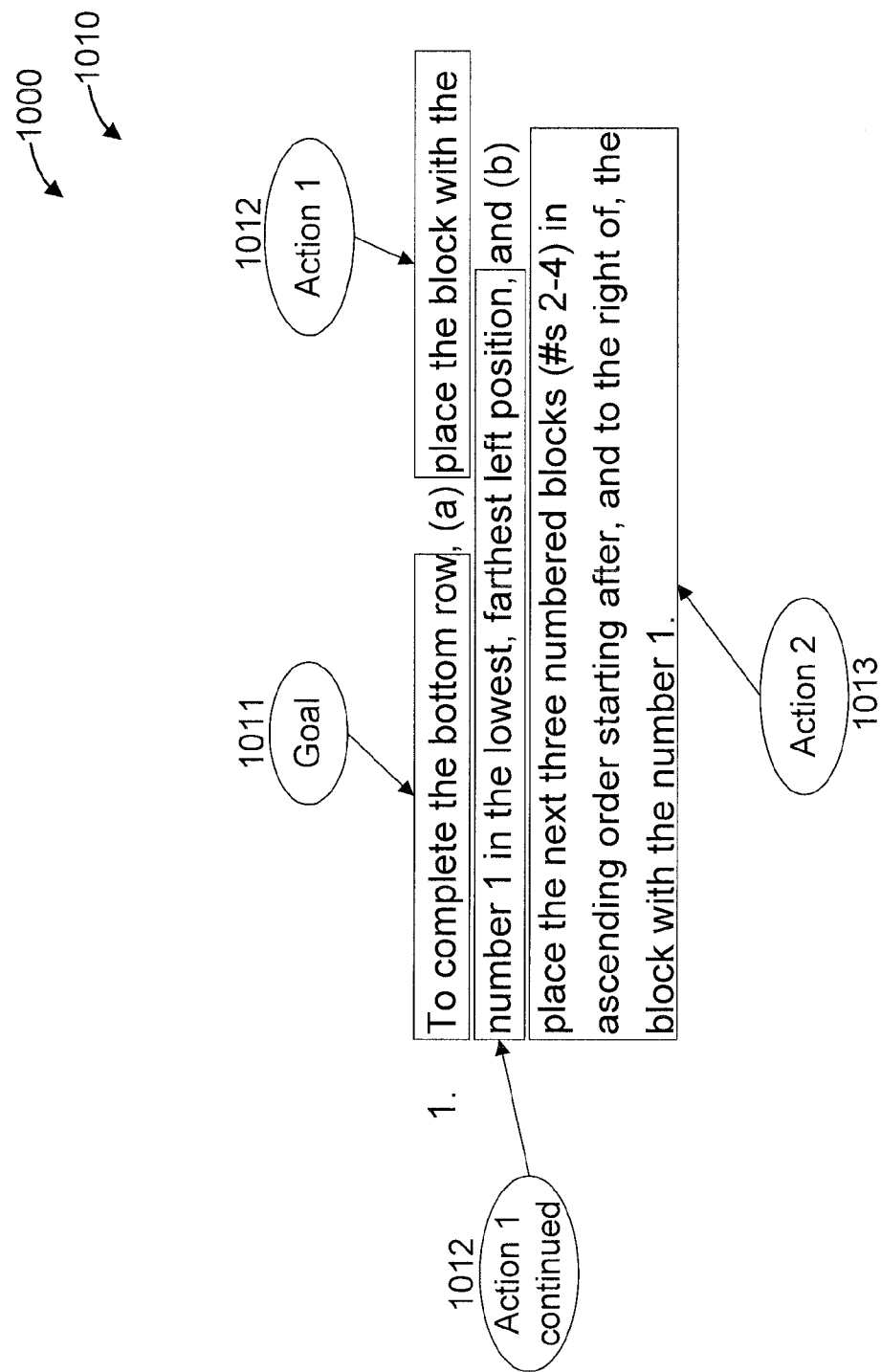
FIG. 10 shows a part of an exemplary textual analysis applied to the procedure of FIG. 7, in accordance with an embodiment of the present principles.

FIG. 10 shows a part 1010 of an exemplary textual analysis 1000 applied to the procedure 700 of FIG. 7, in accordance with an embodiment of the present principles.

In this part 1010 of the analysis 1000, for each step, the goal of that step is identified as well as the actions performed to achieve that goal. As an example, step 1 can be analyzed as follows. In the case of step 1, the goal 1011 is "To complete the bottom row", with a first action 1012 being "place the block with the number 1 in the lowest, farthest left position" and a second action 1013 being "place the next three numbered blocks (#s 2-4) in ascending order starting after, and to the right of, the block with the number 1".

Figure 11:
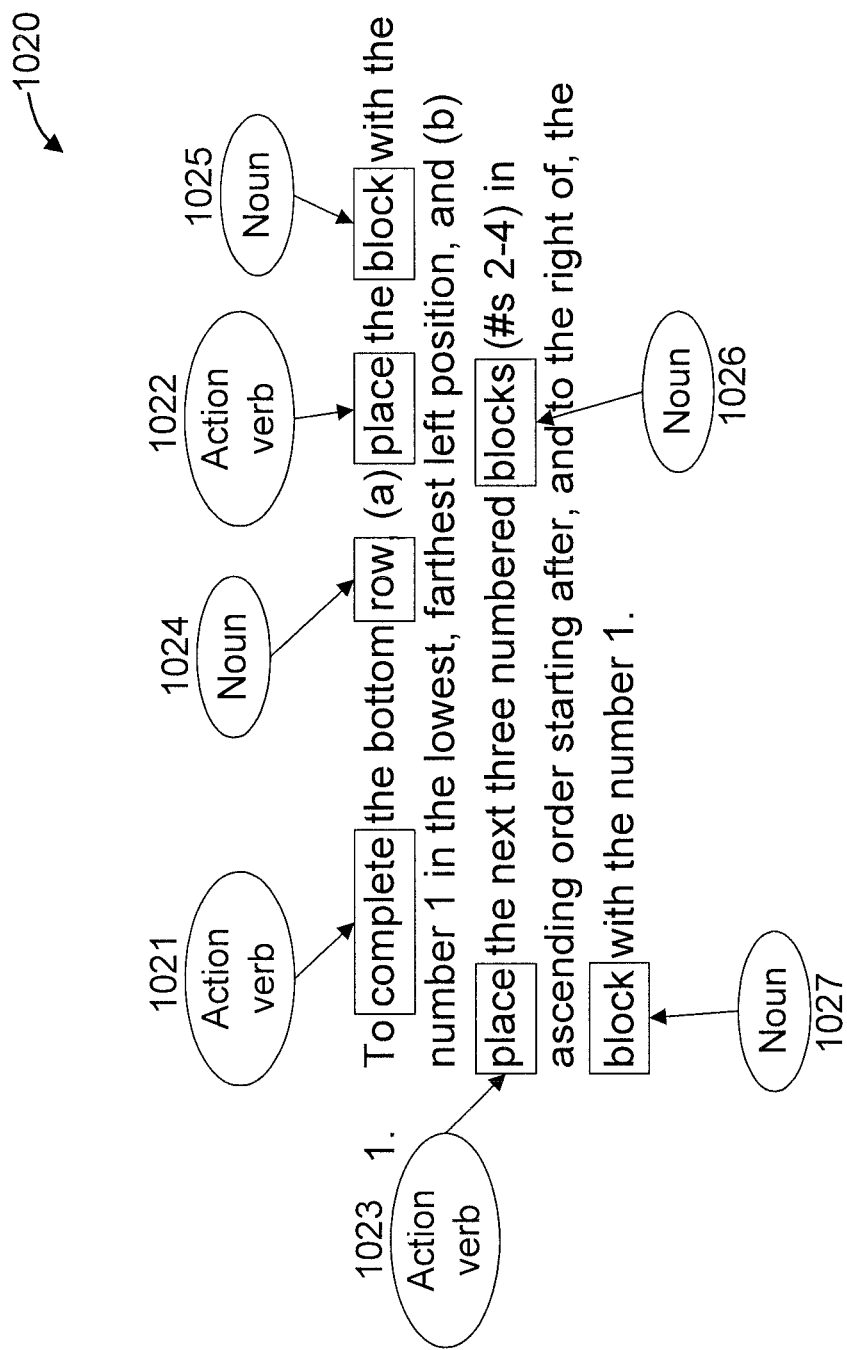
FIG. 11 shows another part of an exemplary textual analysis applied to the procedure of FIG. 7, in accordance with an embodiment of the present principles.

FIG. 11 shows another part 1020 of an exemplary textual analysis 1000 applied to the procedure 700 of FIG. 7, in accordance with an embodiment of the present principles.

In this part 1020 of the analysis 1000, word sense disambiguation is performed to detect multiple action verbs "complete" 1021, "place" 1022, and "place" 1023, and multiple nouns "row" 1024, "block" 1025, "blocks" 1026, and "block" 1027.

Figure 12:
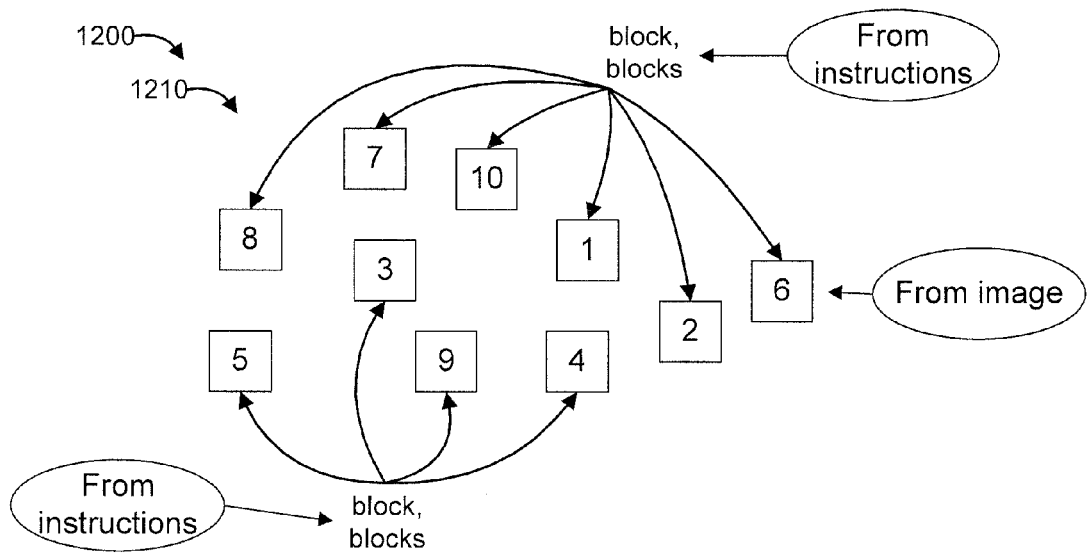
FIG. 12 shows a part of an image analysis applied to the procedure of FIG. 7, in accordance with an embodiment of the present principle.

FIG. 12 shows a part 1210 of an image analysis 1200 applied to the procedure 700 of FIG. 7, in accordance with an embodiment of the present principles. The image analysis 1200 involves both the text and the image content, as well as a matching performed there between. In this part 1210 of the analysis 1200, nouns from the instructions are matched to corresponding nouns in a figure (in this case, the figure shown in FIG. 8). Thus, the blocks are identified as such. While in this simplified example, where the procedure is applied to a single type of item, namely blocks, only 1 type of item is identified, in more complex procedures involving more than one type of item, each of the types can be identified to make the procedure easier to complete for the user.

Figure 13:
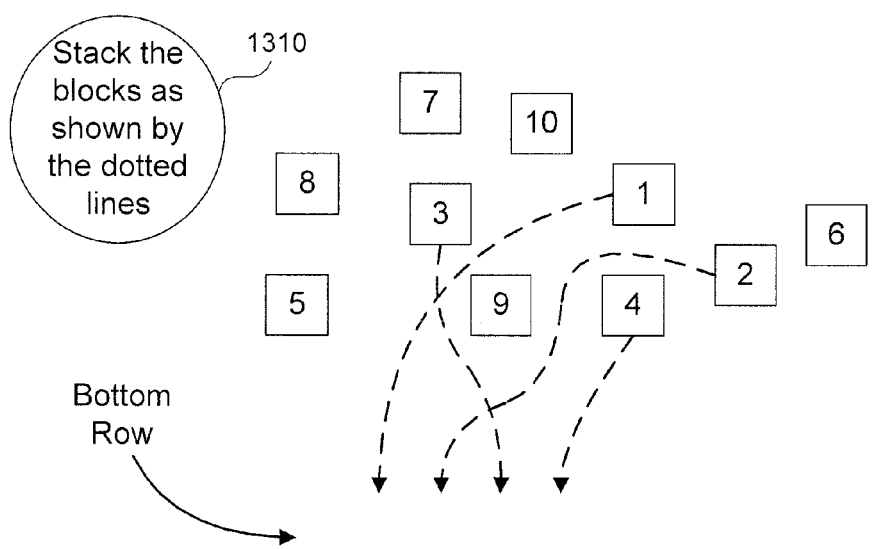
FIG. 13 shows a recommendation for the user regarding step 1 of the procedure 70 of FIG. 7, in accordance with an embodiment of the present principles.

FIG. 13 shows a recommendation 1310 for the user regarding step 1 of the procedure 700 of FIG. 7, in accordance with an embodiment of the present principles.

A recommendation 1310 of how to proceed is made to the user, using instructions provided in the bubble (namely "Stack the blocks as shown by the dotted lines") as well as dashed arrow lines to indicate where to place the objects (blocks).

FIG. 14 shows a progress update 1410 on the user's performance of the procedure 700 of FIG. 7, in accordance with an embodiment of the present principles. The progress update 1410 indicates to the user that "Step 1 is now complete".

While the preceding examples are directed to Step 1 of procedure 700 of FIG. 7, the present principles can be readily applied to each of the steps of procedure 700. As is evident to one of ordinary skill in the art given the teachings of the present principles provided herein, various aspects of the present principles will be implicated depending upon the procedure itself, such as the complexity of the procedure, the number of parts/components involved in the procedure, the number of tools (e.g., wrenches, etc.) involved in the procedure, the level of disambiguation needed to decipher the procedure, and so forth.

A description will now be given of some exemplary scenarios to which the present principles can be applied, in accordance with an embodiment of the present principles.

One exemplary scenario to which the present principles can be applied is troubleshooting a cycling computer. In such a scenario, there is typically a small manual, with instructions on multiple pages, and figures on different pages, where the user has few components, screwdrivers and wrenches, and is working in a restricted environment with grease likely on their hands.

Another exemplary scenario to which the present principles can be applied is changing a broken screen on a handheld device. In such a scenario, there is typically terse documentation, with delicate work that requires both hands, with the risk of damage to a costly device.

Yet another exemplary scenario to which the present principles can be applied is installing a "secret door" bookshelf. In such a scenario, the user is typically dealing with a heavy piece of furniture, with the risk of damage or injury, and where both hands are typically needed and the work is such that the user cannot just leave it in the middle to consult documents.

Still another exemplary scenario to which the present principles can be applied is the initial setup and tuning up of a pneumatic nailer. In such a scenario, typically both hands are required, and where a failure to follow procedure can lead to serious injury. Usually, the pictures are not clear enough, and a lack of familiarity with the device can lead to errors.

A further exemplary scenario to which the present principles can be applied is installing new ceramic brakes on a mountain bike. In such a scenario, the bottom line is that the user better do it right if the user wants to stop the bike when needed. Typically, the user will need both hands, and will be working in a tight environment, possibly with dirty hands.

The preceding scenarios are but a few of an infinite number of scenarios to which the present principles can be applied, as readily appreciated by one of ordinary skill in the art. Thus, the present principles are not limited to the preceding, and can be applied to essentially any documented procedure in order to obtain the inherent benefits of the present principles, as readily appreciated by one of ordinary skill in the art given the teachings of the present principles provided herein, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
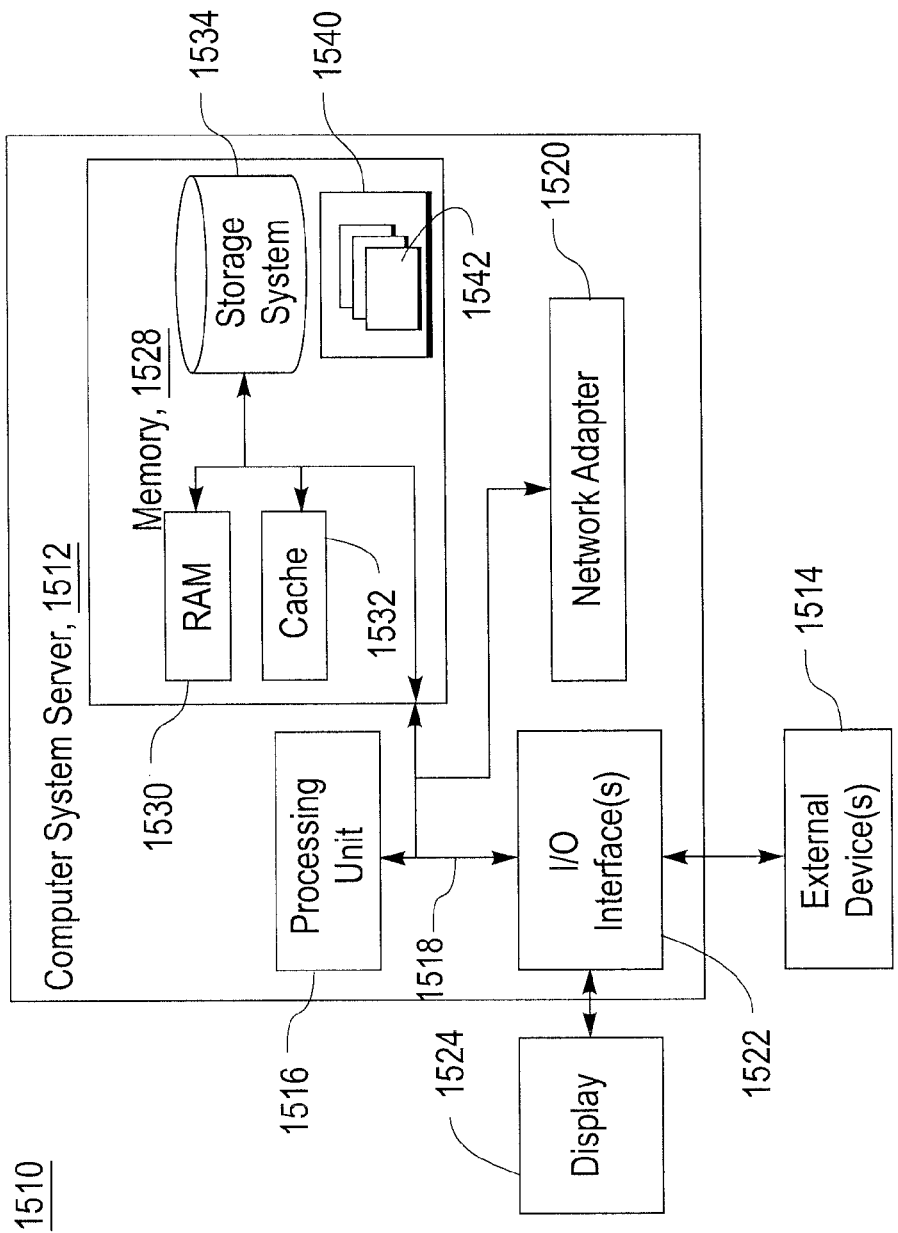
FIG. 15 shows an exemplary cloud computing node, in accordance with an embodiment of the present principles.

Referring now to FIG. 15, a schematic of an example of a cloud computing node 1510 is shown. Cloud computing node 1510 is only one example of a suitable cloud computing node and is not intended to suggest any limitation as to the scope of use or functionality of embodiments of the invention described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 in cloud computing node 1410 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Figure 16:
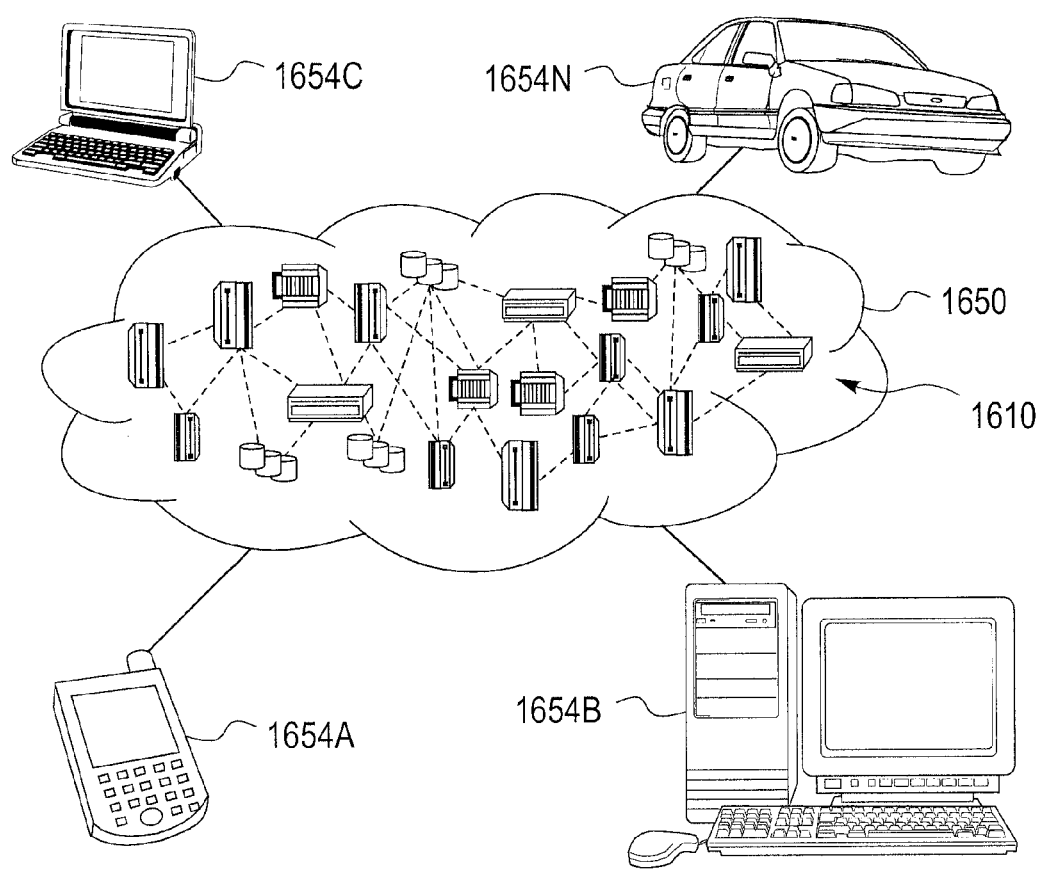
FIG. 16 shows an exemplary cloud computing environment, in accordance with an embodiment of the present principles.

Referring now to FIG. 16, illustrative cloud computing environment 1650 is depicted. As shown, cloud computing environment 1650 comprises one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1762 provides an abstraction layer from which the following examples of virtual entities may be provided: virtual servers; virtual storage; virtual networks, including virtual private networks; virtual applications and operating systems; and virtual clients.

In one example, management layer 1764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and translating procedural documentation into contextual visual and auditory guidance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for assisting a user performing a procedure, the method comprising:
capturing, by a camera, images of user activity while the user is performing the procedure;
converting, by computer processing system, the images of user activity into a text representation of user activity;
comparing, by the computer processing system, the text representation of user activity to procedure documentation;
at least one of visually and audibly indicating, by a display and a speaker, a corrective action to the user responsive to a mismatch result from said comparing step; and
searching, by the computer processing system, through additional information pertaining to a given step with which the user is experiencing difficulty to identify one or more relevant sub-portions, and wherein only the one or more relevant sub-portions are audibly or visually provided to the user while other portions of the additional information are skipped from being audibly or visually provided to the user.

2. The method of claim 1, further comprising capturing, by the camera, text present in the procedure documentation, and wherein said comparing step compares the text representation of user activity to the text present in the procedure documentation.

3. The method of claim 1, further comprising:
capturing, by the camera, images of the procedure documentation; and
converting, by the computer processing system, the images of the procedure documentation into a text representation of the procedure documentation;
wherein said comparing step compares the text representation of user activity to the text representation of the procedure documentation.

4. The method of claim 1, further comprising:
capturing, by the camera, images of the procedure documentation;
applying, by the computer processing system, language processing techniques to the images of the procedure documentation to identify tools and components involved in the procedure; and
visually or audibly indicating, by the display or the speaker, the tools and the components involved in the procedure.

5. The method of claim 1, further comprising:
capturing, by the camera, images of the procedure documentation;
applying, by the computer processing system, language processing techniques to the images of the procedure documentation to identify goals, steps, and actions involved in the procedure; and
visually or audibly indicating, by the display or the speaker, the goals, steps, and actions involved in the procedure.

6. The method of claim 1, further comprising capturing, by the camera, images of the procedure documentation, and wherein said comparing step further compares the images of the procedure documentation to the images of user activity.

7. The method of claim 1, further comprising:
detecting a completion of a current step; and
updating, on the display, displayed information to correspond to a next step.

8. The method of claim 1, further comprising:
identifying when the user is experiencing difficulty with a given step;
retrieving, from a remote source, the additional information pertaining to the procedure or the given step; and
audibly or visually providing, by the speaker or the display, the additional information to the user.

9. The method of claim 8, wherein the additional information comprises an alternate method for performing the given step with which the user is experiencing difficulty.

10. The method of claim 8, wherein the additional information comprises instructional videos or video demonstrations of at least some of the procedure.

11. The method of claim 1, further comprising:
recognizing, using a gesture recognition system, gestures from the user activity; and
evaluating, by the computer processing system, a progress of the user in performing the procedure by correlating the gestures with images from the procedure documentation or a text representation of the images from the procedure documentation.

12. The method of claim 11, wherein said evaluating step comprises comparing labels, generated by the gesture recognition system for classifying the user activity, to the text representation of the images from the procedure documentation.

13. The method of claim 11, further comprising capturing, by the camera, images of the procedure documentation, wherein said evaluating step comprises mapping the gestures to expected user actions depicted in the images of the procedure documentation.

14. A non-transitory computer readable storage medium comprising a computer readable program for assisting a user performing a procedure, wherein the computer readable program when executed on a computer causes the computer to perform the steps of:
- capturing, by a camera, images of user activity while the user is performing the procedure;
- converting, by computer processing system, the images of user activity into a text representation of user activity;
- comparing, by the computer processing system, the text representation of user activity to procedure documentation;
- visually or audibly indicating, by a display or a speaker, a corrective action to the user responsive to a mismatch result from said comparing step; and
- searching, by the computer processing system, through additional information pertaining to a given step with which the user is experiencing difficulty to identify one or more relevant sub-portions, and wherein only the one or more relevant sub-portions are audibly or visually provided to the user while other portions of the additional information are skipped from being audibly or visually provided to the user.

15. A system for assisting a user performing a procedure, the method comprising:
- a camera for capturing images of user activity while the user is performing the procedure;
- a computer processing system for converting the images of user activity into a text representation of user activity, comparing the text representation of user activity to procedure documentation, searching through additional information pertaining to a given step with which the user is experiencing difficulty to identify one or more relevant sub-portions; and
- a display or speaker for at least one of visually and audibly indicating a corrective action to the user responsive to a mismatch result from said comparing step,
- wherein only the one or more relevant sub-portions are audibly or visually provided to the user while other portions of the additional information are skipped from being audibly or visually provided to the user.

16. The system of claim 15, wherein said camera and said display are disposed on a head-mounted device configured to camera images in front of the user and to display procedure related information to the user.

17. The system of claim 15, wherein the computer processing system is implemented as a server using a cloud computing configuration.

18. The system of claim 15, wherein the camera captures text present in the procedure documentation, and wherein the computer processing system compares the text representation of user activity to the text present in the procedure documentation.

\* \* \* \* \*